United States Patent
Porte et al.

[11] Patent Number: 6,123,170
[45] Date of Patent: Sep. 26, 2000

[54] NOISE REDUCING CONNECTION ASSEMBLY FOR AIRCRAFT TURBINE HOUSINGS

[75] Inventors: Alain Porte, Colomiers; Robert Andre, Auzeville, both of France

[73] Assignee: Aerospatiale Societe Nationale Industrielle, Paris Cedex, France

[21] Appl. No.: 09/132,902

[22] Filed: Aug. 12, 1998

[30] Foreign Application Priority Data

Aug. 19, 1997 [FR] France .................................. 97 10481

[51] Int. Cl.[7] .............................. B64D 33/02; F02K 11/00
[52] U.S. Cl. ........................ 181/214; 181/198; 181/200; 181/213; 181/285; 181/292; 239/265.13; 239/265.17; 239/265.19
[58] Field of Search ..................................... 181/198, 200, 181/213, 214, 285, 292; 239/265.13, 265.17, 265.19

[56] References Cited

U.S. PATENT DOCUMENTS

| | | | |
|---|---|---|---|
| 4,161,231 | 7/1979 | Wilkinson | 181/292 |
| 4,293,053 | 10/1981 | Shuttleworth et al. | 181/213 |
| 4,384,634 | 5/1983 | Shutteworth et al. | 181/213 |
| 4,452,565 | 6/1984 | Monhardt et al. | 415/9 |
| 4,509,616 | 4/1985 | Blecherman | 181/214 |
| 5,259,724 | 11/1993 | Liston et al. | 415/9 |
| 5,543,198 | 8/1996 | Wilson | 428/116 |
| 5,581,054 | 12/1996 | Anderson et al. | 181/213 |
| 5,609,313 | 3/1997 | Cole et al. | 244/54 |
| 5,927,647 | 7/1999 | Masters et al. | 244/110 B |

FOREIGN PATENT DOCUMENTS

| | | |
|---|---|---|
| 0352993 | 1/1990 | European Pat. Off. . |
| 2010434 | 6/1979 | United Kingdom . |
| 2065766 | 7/1981 | United Kingdom . |
| 2273131 | 6/1994 | United Kingdom . |

*Primary Examiner*—Paul Ip
*Assistant Examiner*—Edgardo San Martin
*Attorney, Agent, or Firm*—Burns Doane Swecker & Mathis L.L.P.

[57] ABSTRACT

In an aircraft turbine, an assembly consisting of an air inlet structure, a air blower housing (22) and a connecting part (36), is fitted in such a way as to reduce noise including in the junction area between the structure and the housing. The connecting part (36) is fastened onto a rear section (20'), not provided with a honeycomb core, of the internal wall (20) of the air inlet structure. A honeycomb structure (44) is fitted inside the air blower housing (22). The space inside the rear section (20') houses a forward extension (44') of the honeycomb structure (44), or a different honeycomb structure.

30 Claims, 11 Drawing Sheets

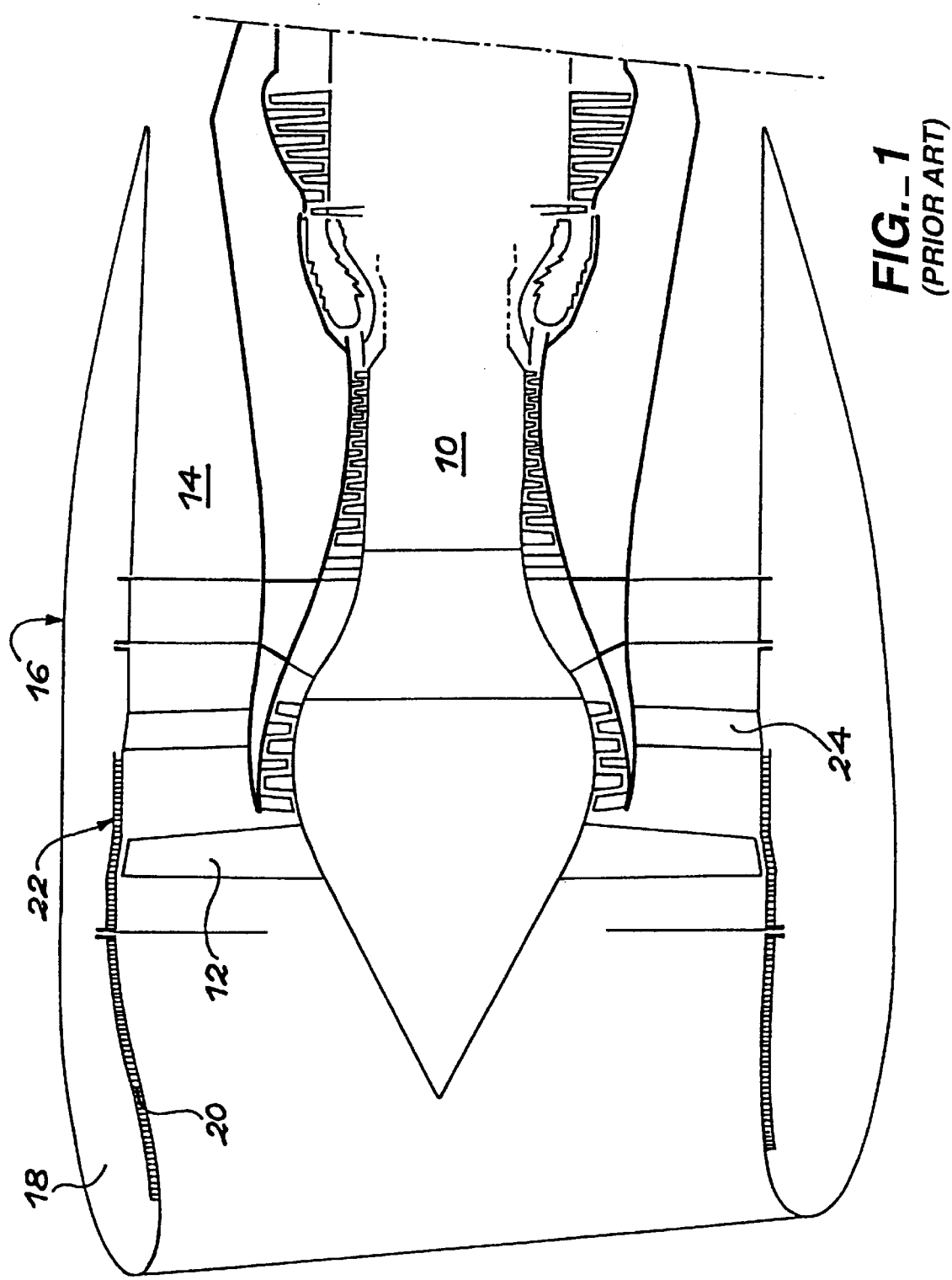
FIG._1 (PRIOR ART)

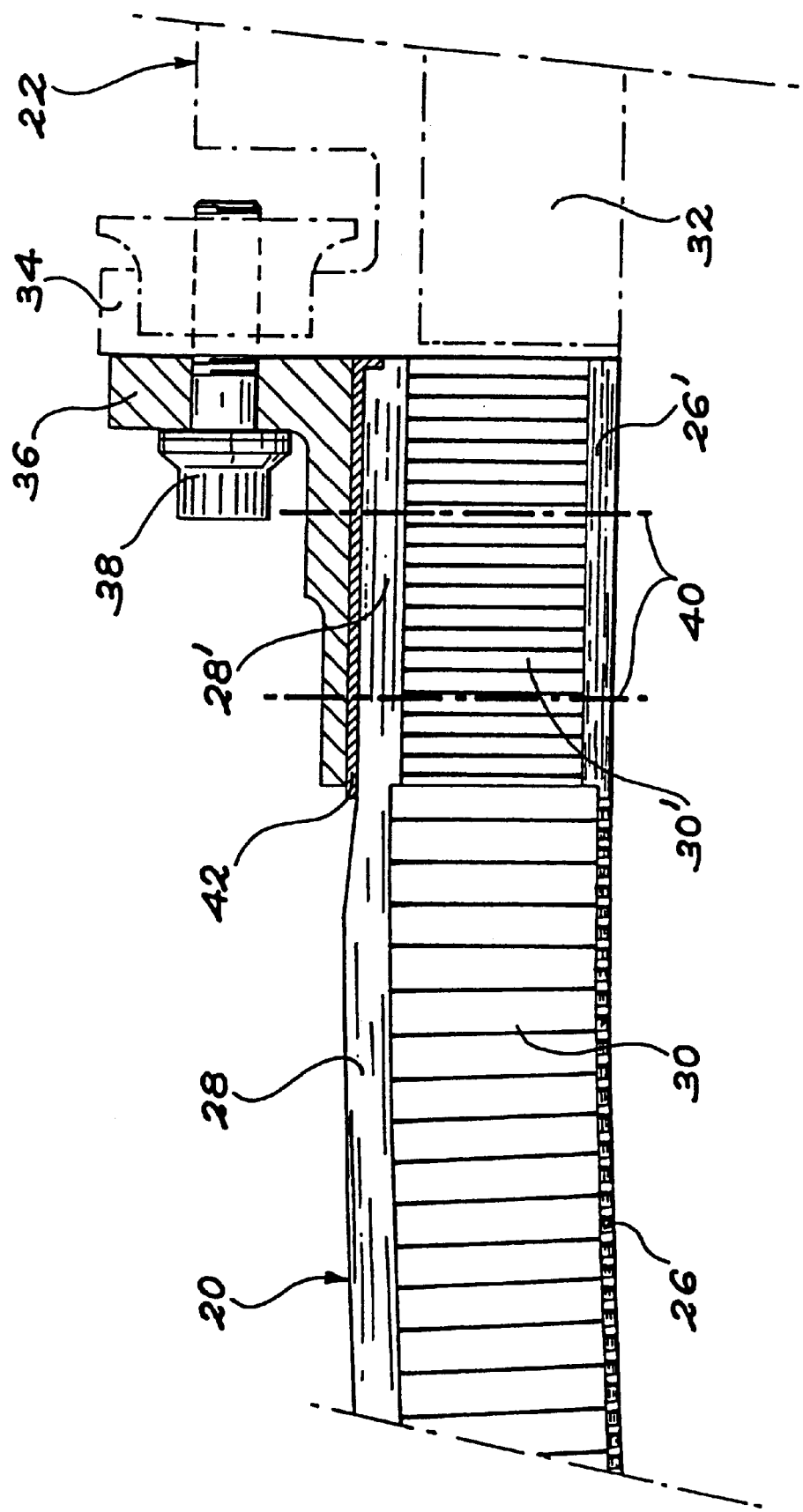
FIG._2
(PRIOR ART)

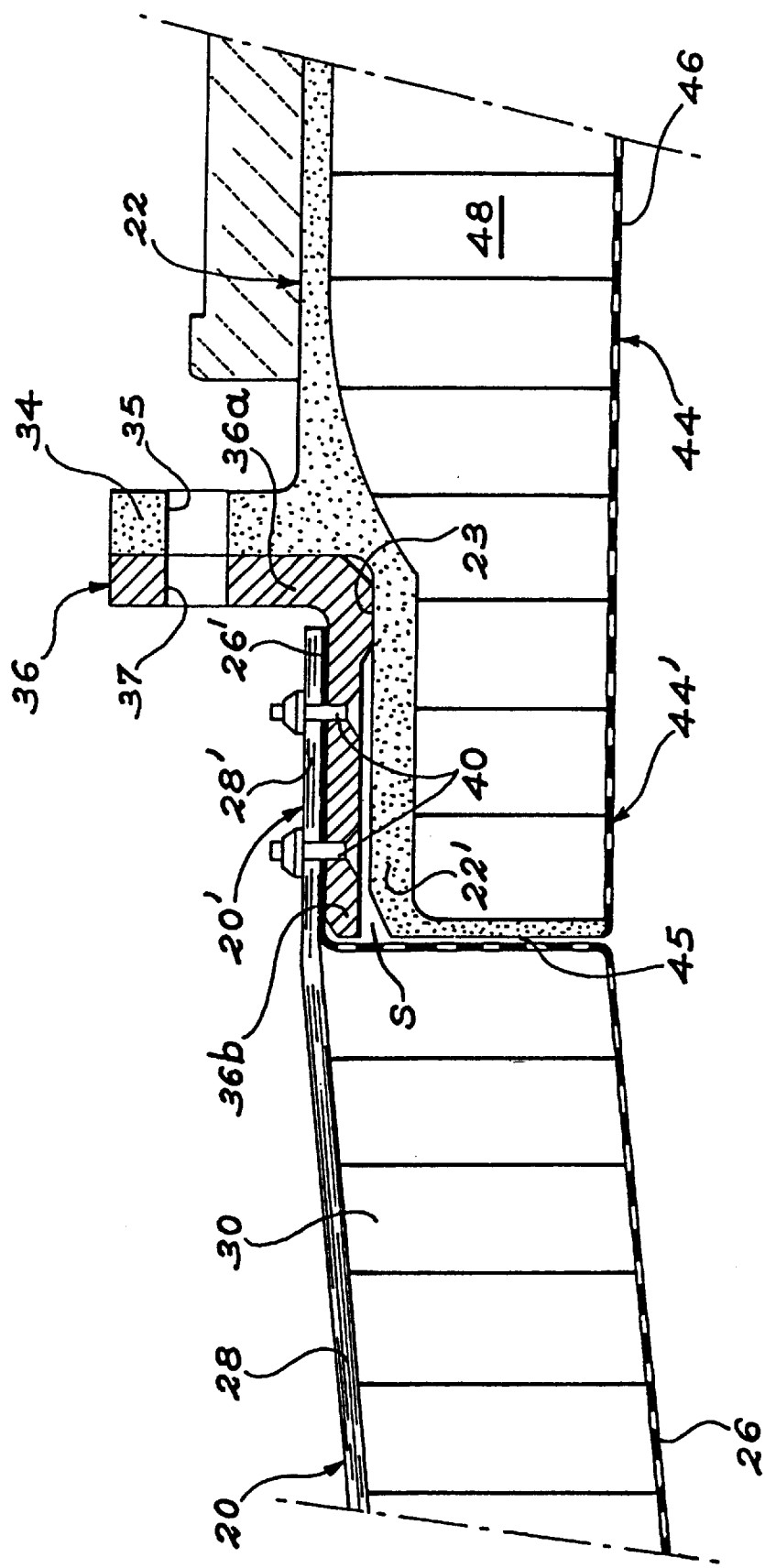
FIG._3

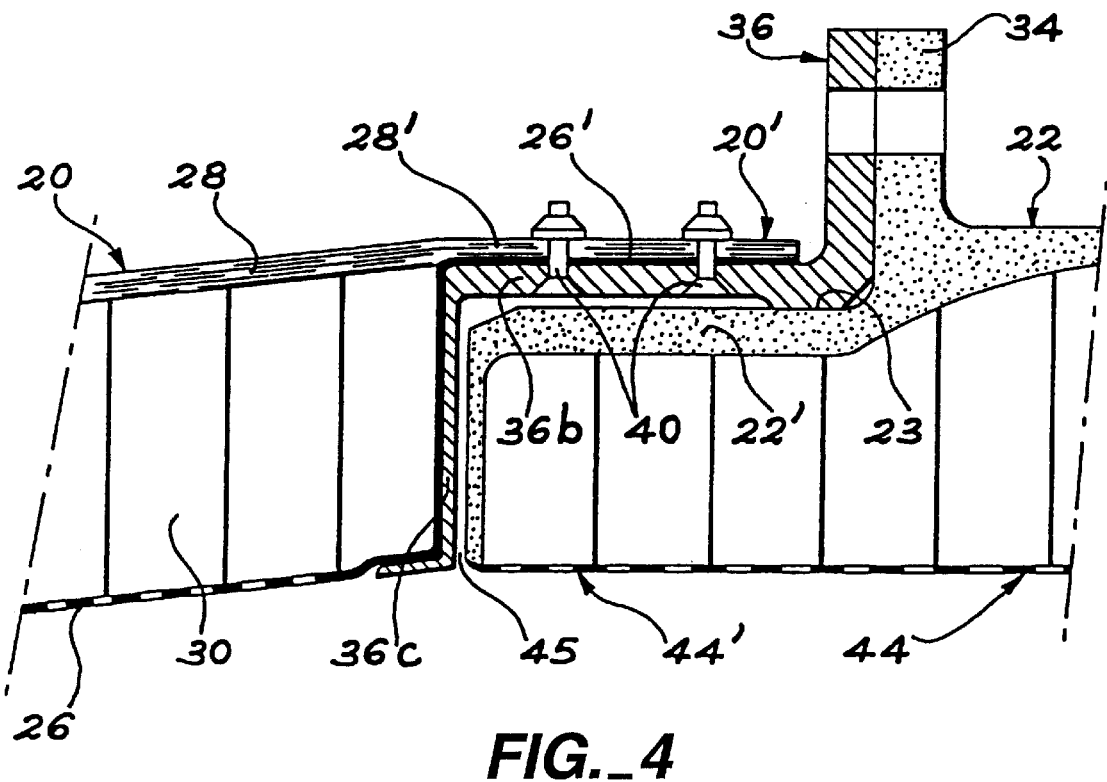
FIG._4
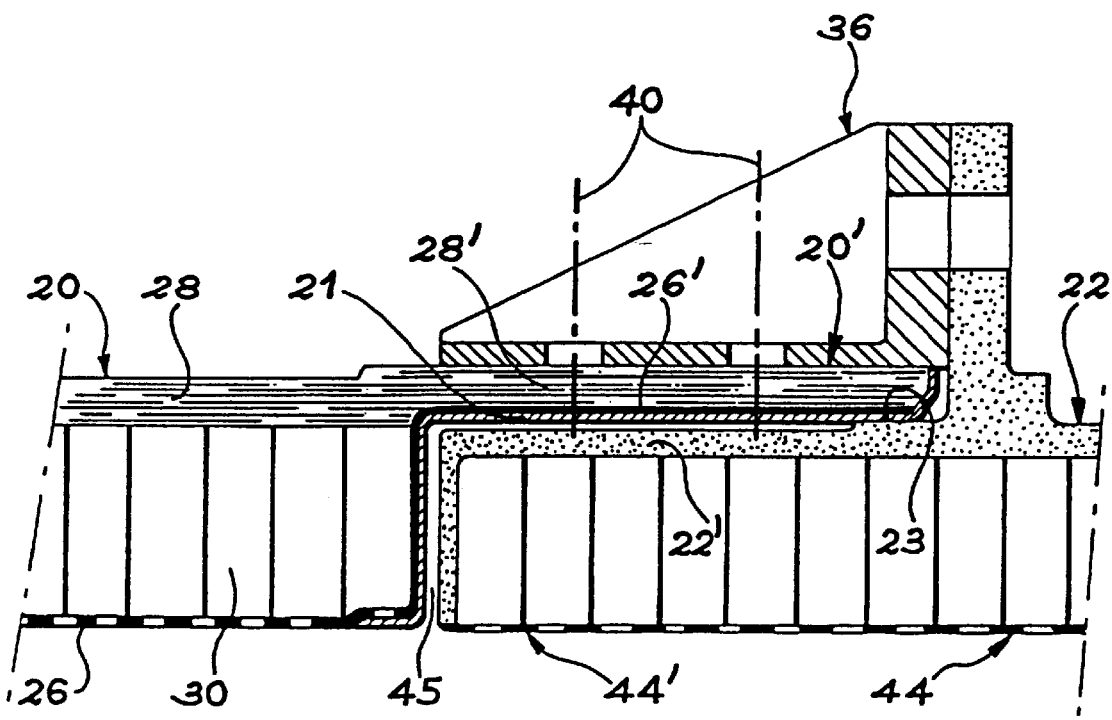
FIG._8

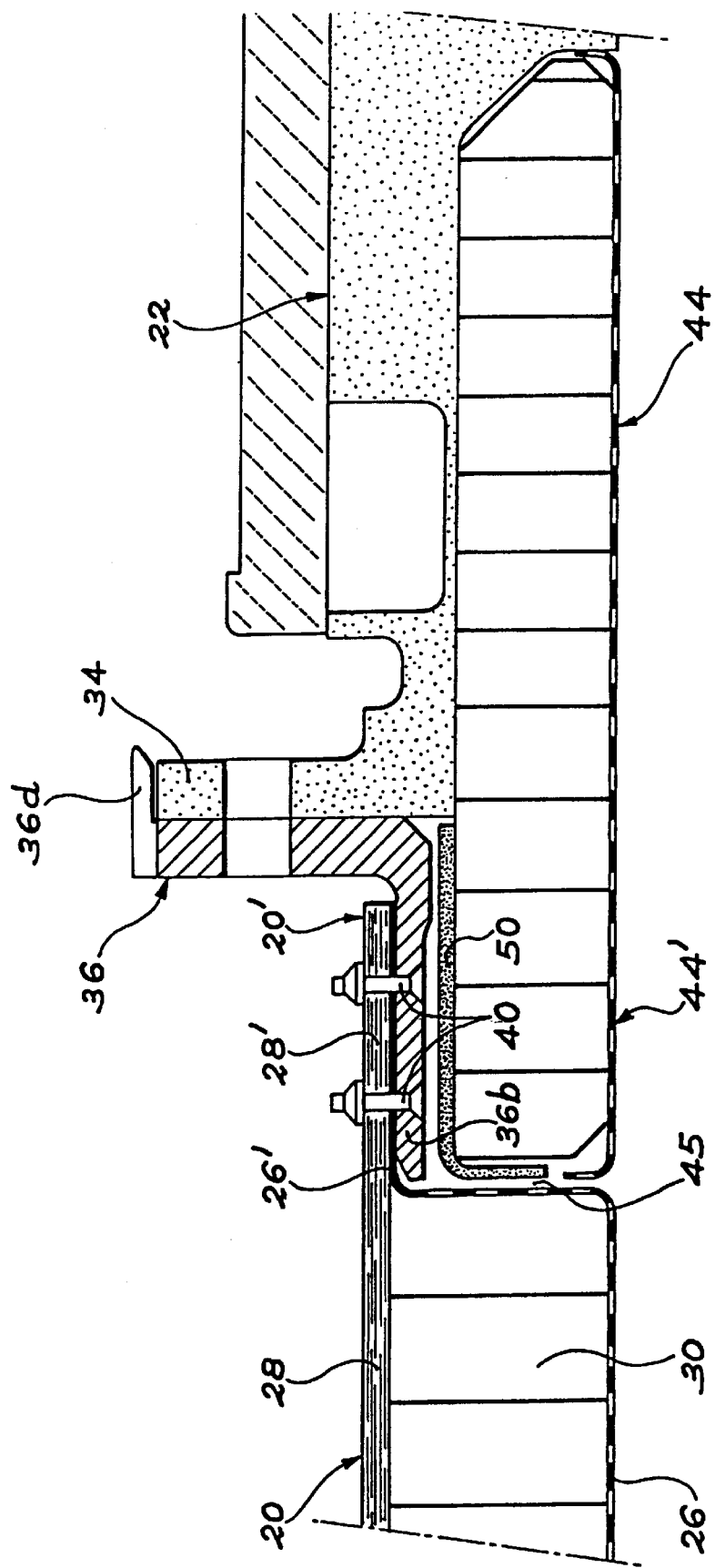
FIG._5

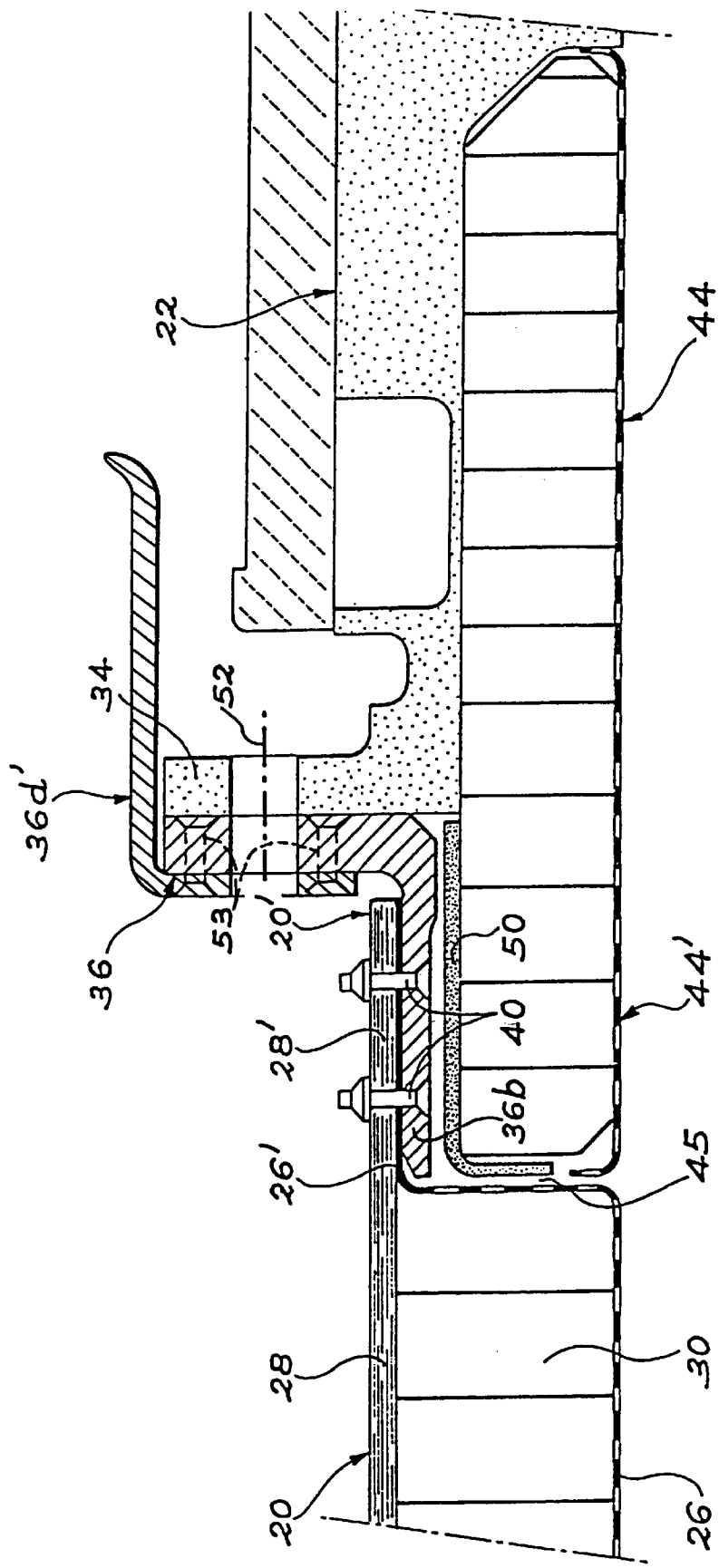
FIG._6

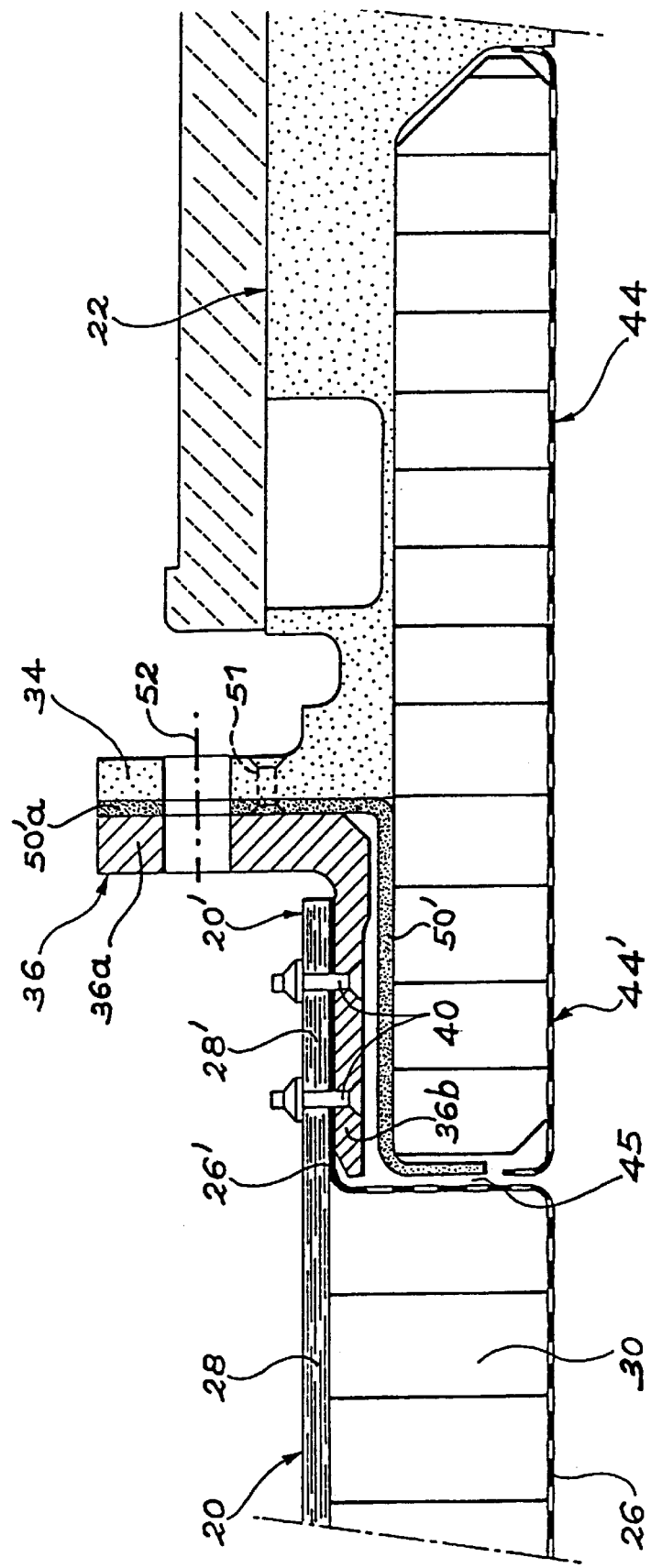
FIG._7

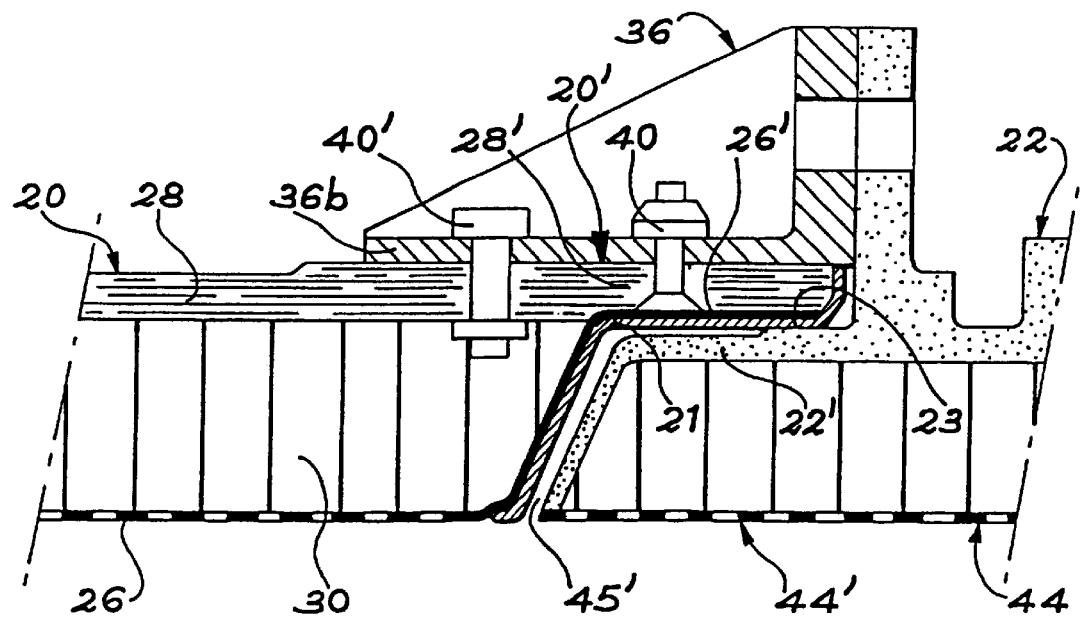
FIG._9
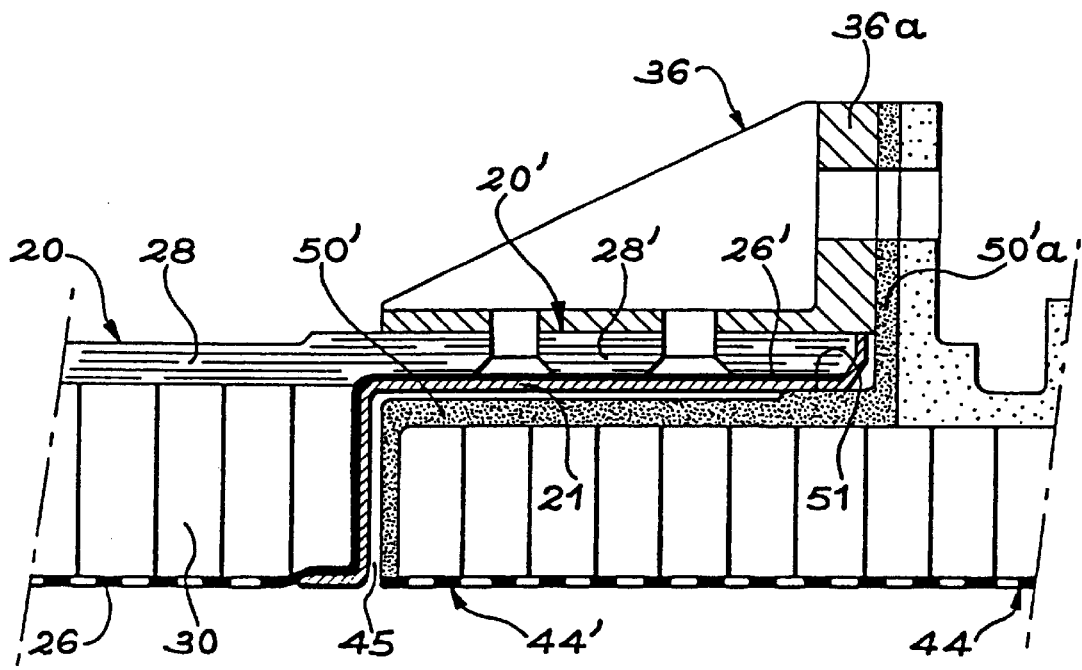
FIG._10

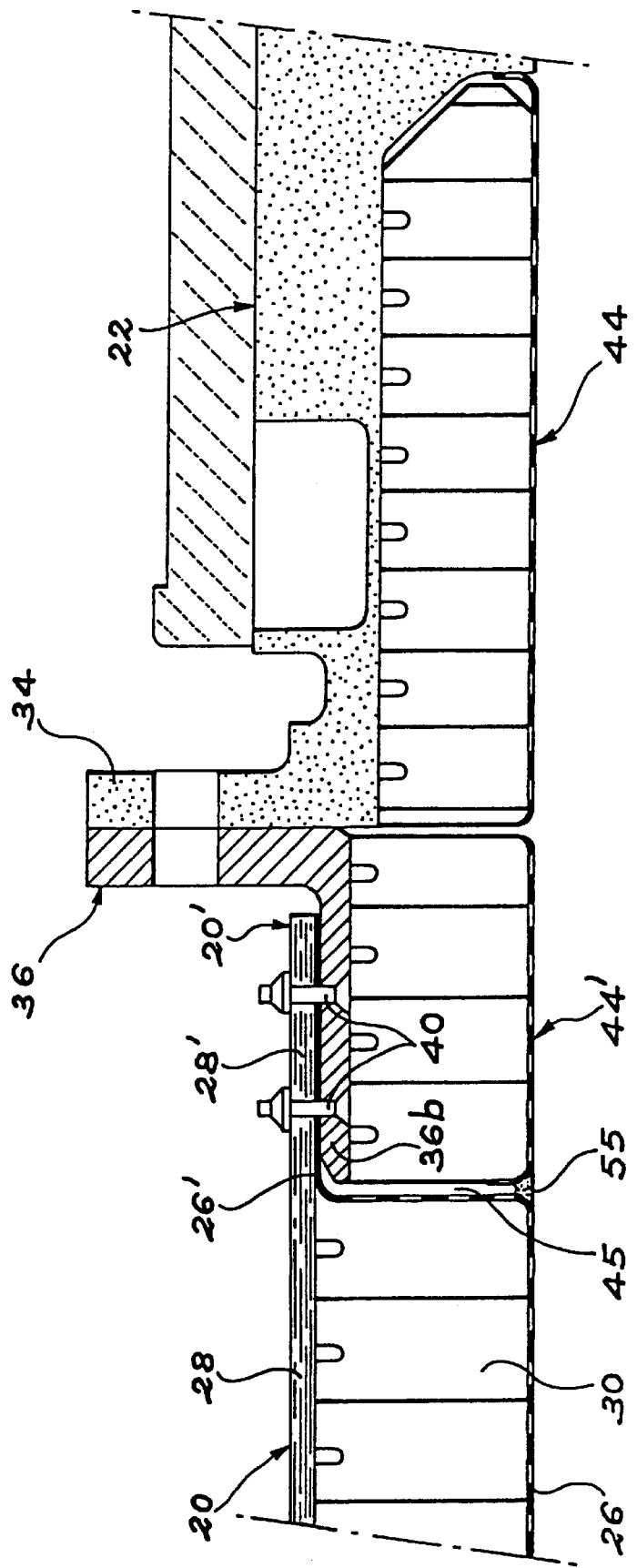
FIG._11

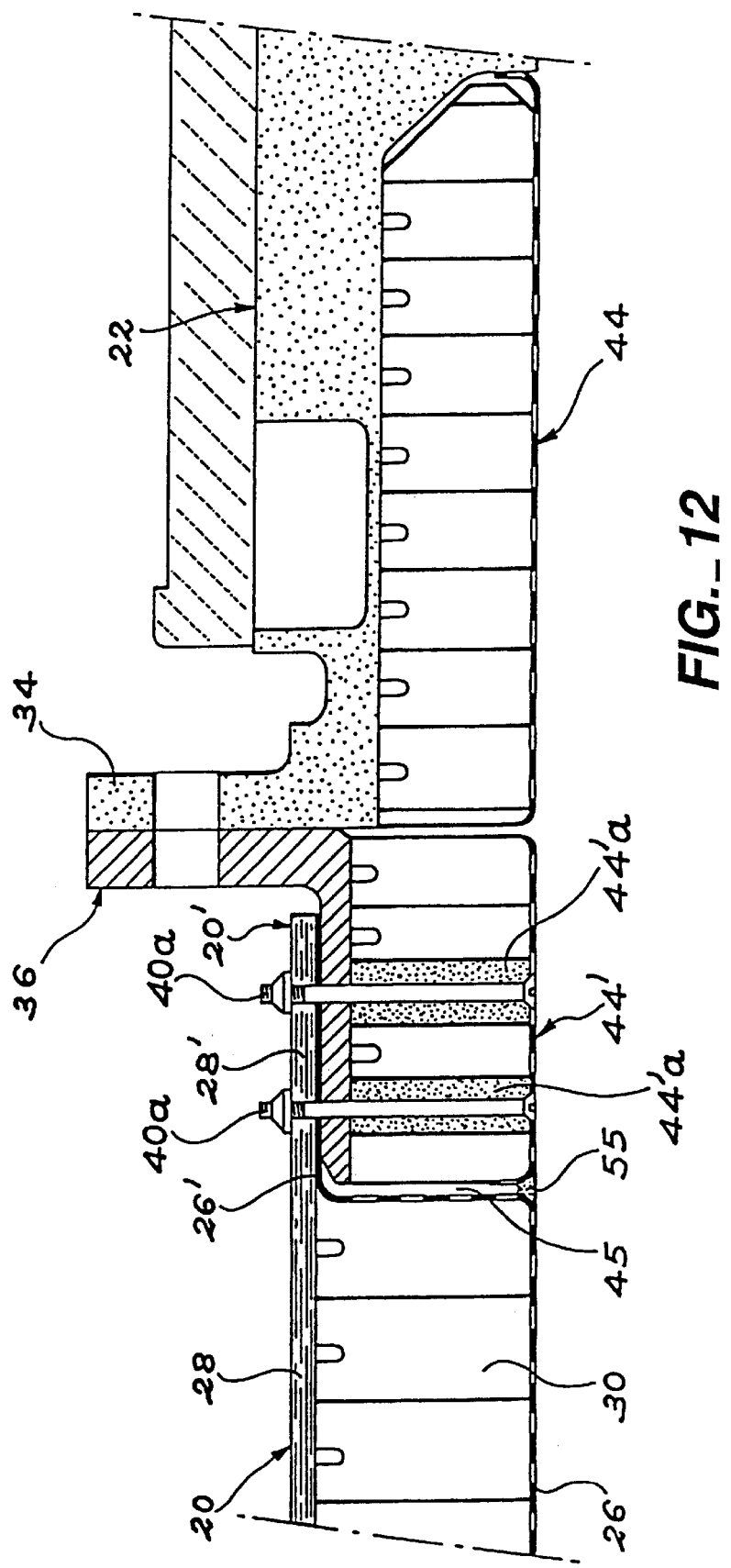
FIG._12

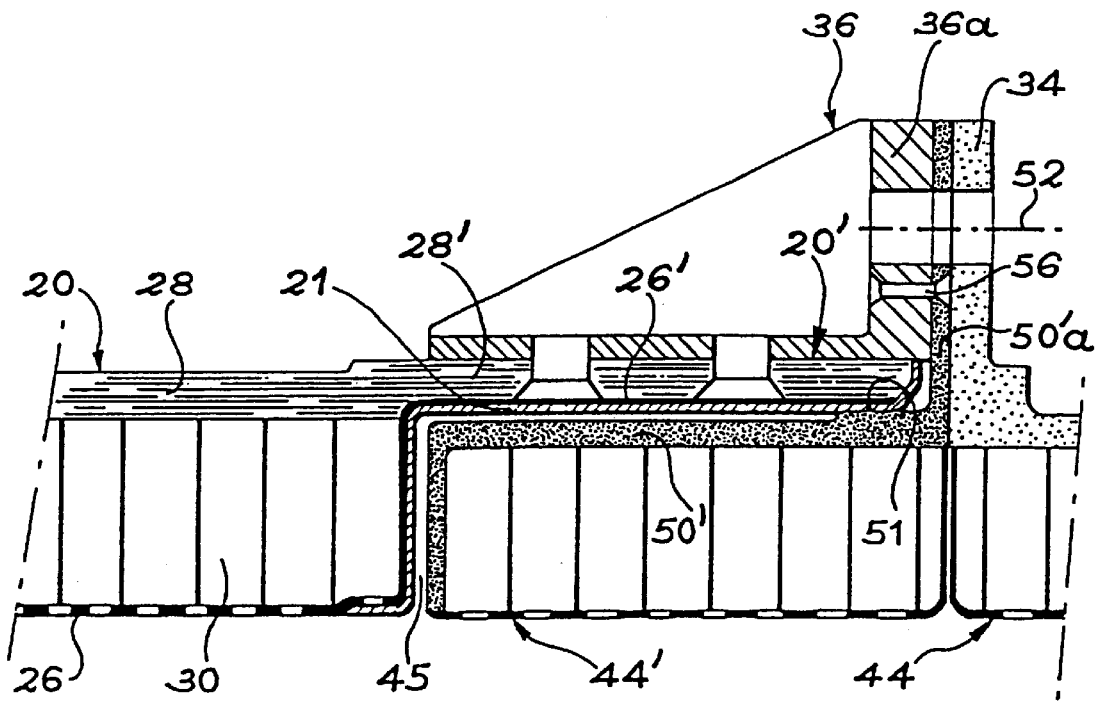
FIG._13
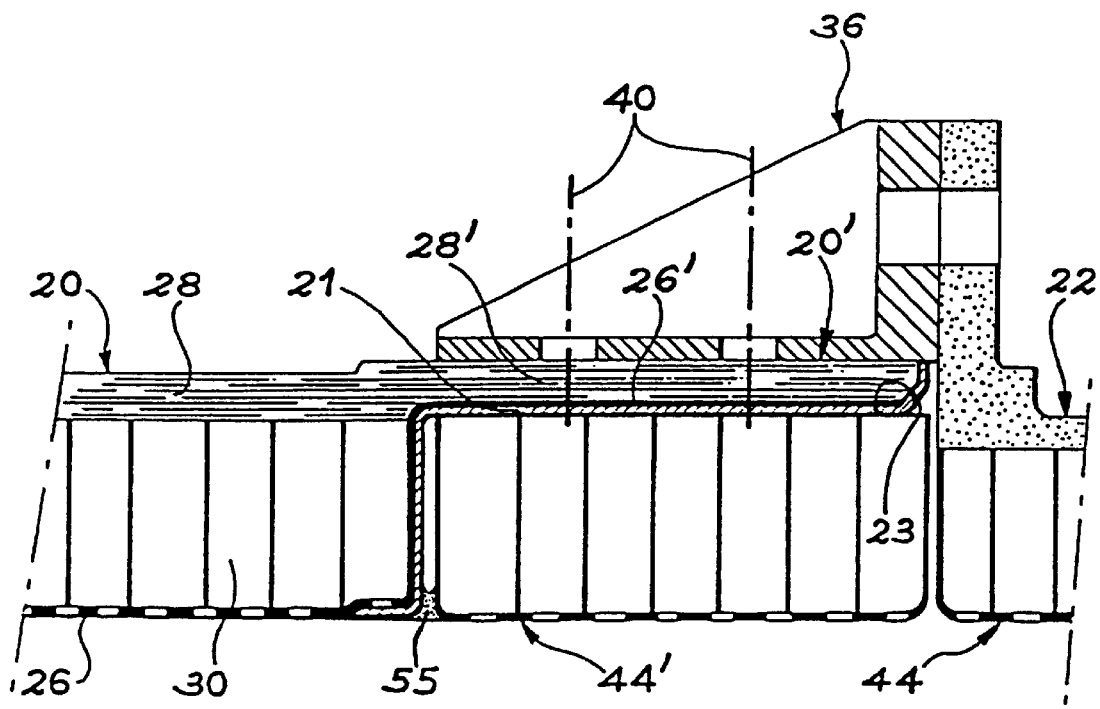
FIG._14

NOISE REDUCING CONNECTION ASSEMBLY FOR AIRCRAFT TURBINE HOUSINGS

DESCRIPTION

1. Field of the invention

The present invention relates to a noise reducing assembly for an aircraft turbine. This assembly comprises an air inlet structure, a blower housing and an annular part used to connect the air inlet structure to the blower housing.

This type of noise reducing assembly can be installed on all turbines that comprise a blower located inside a housing surrounding the motor.

2. Background art

In FIG. 1 of the attached drawings, a standard by-pass turbojet is shown very schematically. A turbine of this kind comprises a central motor 10, centered on a longitudinal axis with the end that is directed towards the front being located on the left of the figure. Working from this front end, the central motor 10 comprises respectively a compressor, a high pressure turbine driving the compressor, a combustion chamber and a low pressure turbine, all known in the art. The low-pressure turbine in turn drives a blower 12 located in front of central motor 10. More precisely, the blades of blower 12 are located in an annular channel 14, known as the "air blower channel", the limits of which are formed by the external envelope of central motor 10 and the internal envelope of a housing 16, arranged coaxially around central motor 10.

The forward section of housing 16 forms an air inlet structure 18 with a streamlined leading edge. The rear end of inner wall 20 of air inlet structure 18 is usually fastened to the forward end of a air blower housing 22. This air blower housing 22 is arranged around air blower 12 and it is rigidly connected to the structure of central motor 10 by at least one set of radially orientated arms 24. This rigid mechanical fastening between the air blower housing 22 and the central motor 10 structure is used to control in the best way the gap that exists between the housing and the blades of air blower 12.

Noise reduction has been one of the main objectives in turbines developed over recent years. In order to achieve this, most of the internal wall of the housing 16 is usually designed as a noise reducing honeycomb structure. As is shown very schematically in FIG. 1, the internal wall 20 of the air inlet structure 18 as well as the air blower housing 22 are usually, at least partly, in the shape of a honeycomb structure.

FIG. 2 of the attached drawings shows in greater detail the junction area of the rear end of internal wall 20 with the forward end of air blower housing 22 in a turbine of the prior art.

Outside the junction area, the internal wall 20 of the air inlet structure has a noise reducing honeycomb structure. This sandwich-type structure consists of an air-permeable internal skin 26, an airtight external skin 28 and a honeycomb core 30 that lies between the skins. The internal skin 26 is made, for example, of perforated sheet metal or a punched-out fabric made of a material such as carbon or metal. The external skin 28 is usually a multi-layered composite structure that acts as a sound reflector and can also transmit the principle forces. Finally, the alveolar core 30 is usually of the honeycomb type with large-size cells.

The air blower housing 22 is usually made of metal. As is shown very schematically in FIG. 2, this part is preferably hollow, at least for a part of the length, so that a noise reducing structure 32 may be fitted to its internal wall. This structure 32 then consists mainly of a honeycomb structure covered with an air-permeable internal skin on the surface facing towards the air blower channel 14.

In order to assemble the air inlet structure 18 and the air blower housing 22, the forward end of the air blower housing is fitted with an external annular flange 34. Assembly is achieved using an annular connection part 36 that is L-shaped in cross-section and fitted around the rear end of the internal wall 20 and fastened to flange 34 with bolts 38 positioned around the circumference.

In turbines of the prior art, the connection between the annular connection part 36 and the internal wall 20 of the air inlet structure is made using fastening means such as countersunk screws or rivets (schematically shown by dot-and-dash lines 40 in FIG. 2), that pass through the entire thickness of the rear end of internal wall 20.

To account for the fact that most of the forces transmitted between the central motor 10 and the air inlet structure 18 cross this junction area, the rear end structure of the internal wall 20 is modified in this section so as to be reinforced.

Therefore, as shown in FIG. 2, the rear section of internal wall 20, onto which the annular connection part 36 is fastened, has an internal skin 26' that is reinforced and impermeable to the air, an external skin 28' that is also reinforced, as well as a reinforced honeycomb core 30' that is usually made of metal (aluminum) and highly densified, formed of small honeycombs that are often filled with resin in order to withstand the crushing effect of fastening means 40.

A major disadvantage of the technique currently used to make the junction between the air inlet structure and the air blower housing is a complete loss of noise reduction in the junction area.

This technique also has the following disadvantages: the mass at the junction area is increased, the risk of corrosion of the metal honeycomb core is increased, making manufacture difficult (e.g. distortion of small honeycombs, the difficulty of machining in the shape of the honeycomb core) and causing difficulties when installing fastening means through honeycomb core 30'; the rear section of internal wall 20 also tends to distort under load conditions where the fastening means are located.

Finally, given that the internal wall 20 usually consists of a series of tape-laying operations on a chuck that is the internal part of the air inlet structure, its external dimensions are not very accurate. Before fastening the annular connection part 36 to the rear end of internal wall 20, it is therefore necessary to re-machine this external surface and to insert an annular wedge 42.

DISCLOSURE OF THE INVENTION

The invention relates mainly to a noise reducing assembly comprising an air inlet structure and a air blower housing of an aircraft turbine, this assembly also being used to reduce noise at the junction area while reducing the mass in comparison with current techniques.

The noise reducing assembly of the present invention also aims at facilitating manufacture and assembly while eliminating the risk of the internal wall of the air inlet structure distorting under load conditions where the fastening means are located.

According to the present invention, this result is achieved by means of a noise reducing assembly for turbines, the assembly comprising an air inlet structure provided with an internal wall with a permeable internal skin, an impermeable external skin and an honeycomb core, a air blower housing provided with an external annular flange at its forward end and fitted with a first noise reducing honeycomb system on the inside, and an annular connecting part fastened to the flange and a rear section of the internal wall, characterized in that the rear section of the internal wall, to which the annular connecting part is fastened, is not provided with a honeycomb core and is located more or less in line with the external skin, and in that a second noise reducing honeycomb structure is added to the inside of the rear section of the internal wall.

In a preferred type of embodiment of the invention, the rear section of the internal wall comprises extensions towards the rear of the internal skin and the external skin, applied one against the other.

The cross-section of the connecting part is preferably L-shaped with the arms being respectively fastened to the flange and to the rear section of the internal wall.

In a first type of embodiment of the invention, one of the arms of the connecting part is fastened to the inside of the rear section of the internal wall. This type of embodiment has the advantage of not requiring re-machining. The shape and measurements of the inner surface of the internal wall of the air inlet structure are accurately dimensioned during the manufacture of the air inlet structure by a series of successive tape-laying operations.

In this first type of embodiment of the invention, the connecting part may comprise a forward section that extends radially towards the inside along a forward surface of the honeycomb core.

In a second type of embodiment of the invention, one of the two arms of the connecting part is fastened to the outside of the rear section of the internal wall. Re-machining is required in order to adjust the connecting part accurately to the rear section of the internal wall.

The invention also covers two different embodiments of the second honeycomb structure, located at the junction area.

In a first embodiment, the second noise reducing honeycomb structure consists of an extension towards the front of the noise reducing honeycomb structure. The advantage of this layout is that it avoids modifying the air blower housing.

In a second embodiment of the invention, the second noise reducing honeycomb structure is separated from the first noise reducing honeycomb structure.

In the first embodiment, the extension towards the front of the honeycomb structure can either be located on the inside of an extension towards the front of the air blower housing or on the inside of an added part that is fastened onto the extension of the honeycomb structure.

In the first and second embodiments, an added part comprising a plane section fastened between the flange and the connecting part can also surround the second noise reducing honeycomb structure.

In the first type of embodiment of the invention, where an extension is present, the connecting part can be centered on the extension towards the front of the air inlet structure.

In the second type of embodiment of the invention, the rear section of the internal wall of the air inlet structure can either be centered on the extension towards the front of the air blower housing where the extension is present, or on the added part if it is fastened between the flange and the other arm of the connecting part.

In the first embodiment of the invention and when an added part fastened directly onto the extension of the honeycomb structure is used, the connecting part may bear the centering and guiding sections located around the flange. The centering and guiding sections can either be included in the connecting part or can be fastened to the connecting part by different means to those used to fasten the connecting part to the flange of the air blower housing.

The junction surface separating the second honeycomb structure from the internal wall adjacent to the rear section can either be radially orientated or inclined backwards towards the outside.

In the first embodiment, when an added part surrounds the second noise reducing honeycomb structure and comprises a plane section fastened between the flange and the connecting part, the fastening means of the plane section can be the same as those that connect the flange to the connecting part; different means may also be used.

In the second embodiment of the invention, when an added part surrounds the second noise reducing honeycomb structure and comprises a plane section fastened between the flange and the connecting part, the fastening means of the plane section are preferably different from those that connect the connecting part and the flange. The second honeycomb structure is then advantageously fastened to the added part.

When the second embodiment of the invention and the second type of embodiment of the invention are combined, the second honeycomb structure is preferably fastened directly onto the inside of the rear section of the internal wall of the air inlet structure.

On the contrary, when the second embodiment of the invention is combined with the first type of embodiment of the invention, the second honeycomb structure is preferably fastened to the inside of the connecting part.

In the latter example, the second honeycomb structure advantageously comprises at least one reinforced resistance area which the removable means for fastening pass through, connecting the said second honeycomb structure to the connecting part and connecting the latter part to the rear section of the internal wall.

In the same example, aerodynamic leaktightness means are preferably inserted between the internal wall of the air inlet structure and the second honeycomb structure on an internal wall of the said second honeycomb structure.

BRIEF DESCRIPTION OF THE DRAWINGS

Non-limitative examples of the invention will now be described with reference to the attached figures where:

FIG. 1 (described above) is a schematic view of a longitudinal section of a by-pass turbojet of the prior art;

FIG. 2 (described above) is an enlarged view of the junction area of the prior art between the air inlet structure and the air blower housing of the turbine in FIG. 1;

FIG. 3 is a similar cross-section to that in FIG. 2, showing a first embodiment of the invention combined with a first type of embodiment of the invention of the junction area between the air inlet structure and the air blower housing of a turbine according to the invention;

FIGS. 4 to 7 are similar cross-sections to that of FIG. 3 showing modifications to the first type of embodiment of the invention combined with the first embodiment of the invention;

FIG. 8 is a similar cross-section to that of FIG. 3, showing the first embodiment of the invention combined with a second type of embodiment of the junction area;

FIGS. 9 and 10 are similar cross-sections to that of FIG. 8 showing two modifications of the second type of embodiment of the junction area combined with the first embodiment of the invention;

FIG. 11 is a similar cross-section to that of FIG. 3 showing a second embodiment of the invention combined with the first type of embodiment of the junction area;

FIG. 12 is a similar cross-section to that of FIG. 11 showing a modification of the second embodiment of the invention combined with the first type of embodiment of the junction area;

FIG. 13 is a similar cross-section to that of FIG. 11 showing the second embodiment of the invention combined with the second type of embodiment of the junction area; and FIG. 14 is a similar cross-section to that of FIG. 13 showing a modification of the second embodiment of the invention combined with he second type of embodiment of the junction area.

DETAILED DESCRIPTION OF PREFERRED TYPES OF EMBODIMENT AND EMBODIMENTS OF THE INVENTION

FIGS. 3 to 14 show non-limitative examples of various possible embodiments of the invention. More precisely, these figures show the junction area between the rear end of the internal wall 20 of an air inlet structure and the front end of a air blower housing 22, in a turbine of the type previously described in FIG. 1.

In standard turbines, in front of the junction area, the internal wall 20 of the air inlet structure has a sandwich structure comprising an air-permeable internal skin 26, an airtight external skin 28 and a honeycomb core 30 inserted between the two skins. As this structure is identical to standard turbines, it will not be described in further detail.

According to the invention, the rear section 20' of the internal wall 20, used for the junction between this said surface and the air blower housing 22, is not provided with a honeycomb core. Moreover, the rear section 20' of the internal wall 20 is more or less located in line with the external skin 28. Said rear section 20 comprises extensions towards the rear 26' and 28' of the internal skin 26 and external skin 28 respectively. The extensions 26' and 28' are applied one against the other once the internal skin 26 has been directed along the rear surface of the honeycomb core 30, as shown in FIGS. 3 to 14.

As the rear section 20' of the internal wall 20 is not provided with a honeycomb core 30 and is located in line with the external skin 28, an annular space exists on an inside surface of rear section 20' between said rear section and the air blower channel. This annular clearance is used to house a noise reducing honeycomb structure 44'.

The noise reducing honeycomb structure 44' links noise reducing honeycomb structure 44, that is fitted inside air blower housing 22, to internal wall 20 of the air inlet structure 18.

In a first embodiment of the invention, shown in FIGS. 3 to 10, the noise reducing structure 44' housed on an internal side of the rear section 20' of the internal wall 20 is made in a single piece with the honeycomb structure 44 of the air blower housing 22 of which it forms an extension towards the front.

In a second embodiment of the invention, shown in FIGS. 11 to 14, the noise reducing honeycomb structure 44' is an individual part that is separated from the honeycomb structure 44 fitted in the air blower housing.

According to the invention, the internal wall of the turbine housing is therefore fitted with a virtually unbroken series of noise reducing honeycomb structures in the junction area between the air inlet structure and the air blower housing, thus achieving improved noise reduction.

The present invention also gives rise to a significant reduction in mass, a reduction in the risk of corrosion and protects part 36b from fire (in the first embodiment of the junction area shown in FIGS. 3 to 8, 11 and 12).

Moreover, repairs are simplified due to the fact that the rear section of the internal wall fastened to the annular connecting part is a single part. The fastening means used can be molded, and therefore easily removed, given that the rear section is not exposed to the aerodynamic flow. These factors all contribute to reducing running costs.

Like junctions in the prior art, the connection between the internal wall 20 and the air blower housing 22 is made by means of an annular connection part 36 with an L-shaped cross-section. A first arm 36a of part 36 constitutes a circular flange that is fastened to the external annular flange 34 provided at the forward end of the air blower housing 22. Bolts (not shown) are used as fastening means passing through matching holes 35 and 37 provided in flange 34, and in first arm 36a of part 36 respectively.

The second arm 36b of the annular connection part 36 forms cylinder that is housed on an internal side of the rear section 20' of the internal wall 20 in the first type of embodiment of the junction area shown in FIGS. 3 to 8 (first embodiment) and 11 and 12 (second embodiment).

The fastening of rear section 20' of the internal wall 20 to the second arm 36b of the annular connection part 36 is made using fastening means 40 such as counter-sunk screws or rivets. Given that rear section 20' of internal wall 20 is not provided with a honeycomb core, fastening can be made without any particular problems and without the risk of distortion under load conditions. Furthermore, as most of the forces are transmitted through external skin 28, forces are transmitted in a way that is as efficient as in structures of the prior art.

In the first type of embodiment of the invention, since the second arm 36b of annular connection part 36 is located inside the rear section 20' of the internal wall 20, no re-machining is required when assembling. The inner surface of wall 20 is perfectly shaped and dimensioned because manufacture of the surface using tape-laying techniques is undertaken beginning with the tape-laying of the internal skin 26 on a chuck of known shape and measurements.

The absence of a reinforced honeycomb core, usually metal and highly densified, also facilitates manufacture of the internal wall 20, in particular by avoiding machining difficulties of high density honeycomb structures and curving of different layers on the chuck used in the tape-laying process.

In FIGS. 3 and 4, the air blower housing 22 has an extension 22' that goes forward beyond the flange 34. The extension 22' extends as far as the rear surface of honeycomb core 30 in the annular clearance provided inside of rear section 20' of wall 20. The forward extension 44' of noise reducing honeycomb structure 44 is then fastened directly inside extension 22'.

Noise reducing honeycomb structure 44 as well as the forward extension 44' consist of an air-permeable internal skin 46 having a similar structure to that of the internal skin 26 of internal wall 20, and a honeycomb core 48 inserted between internal skin 46 and air blower housing 22. Honeycomb core 48 also has a similar structure to honeycomb core 30 of internal wall 20. In this configuration sound reflection and transmission of forces are ensured by air blower housing 22 itself.

As has been shown, in particular in FIGS. 3 and 4, the extension 22' of air blower housing 22 advantageously covers the front edge of honeycomb core 48.

Given that air blower housing 22 is usually made of metal, the external surface 23 of the forward extension 22' can be machined in order to center the annular connection part 36, as shown in FIGS. 3 and 4.

The modification shown in FIG. 4 differs chiefly from that shown in FIG. 3 in that the connection part 36 comprises a forward section 36c that lies radially towards the inside along the rear surface of honeycomb core 30 of internal wall 20.

Again in the first embodiment of the invention, FIG. 5 shows another modification of the first type of embodiment of the junction area in which the forward extension 22' of the air blower housing 22 has been removed. In this configuration the forward extension 22' of the noise reducing honeycomb structure 44 is housed inside an added part 50. Added part 50 has an L-shaped cross-section in which one of the surrounds the forward extension 22' of the honeycomb structure 44 and the other arm at least partly covers the edge of the structure. In this configuration, added part 50 is fastened onto the forward extension of the honeycomb structure 44 by fastening means such as cover plates (not shown).

In this modification of the embodiment shown in FIG. 5, the connection part 36 comprises centering and guiding sections 36d that are located around flange 34 of the air blower housing 22 so that they center part 36 in relation to the housing in FIG. 5. The centering and guiding sections 36d are integral parts of the connection part 36.

Similarly, FIG. 6 shows the fastening of the centering and guiding sections 36d' to connection part 36. Sections 36' are fastened onto part 36 by fastening components 53 located in different positions from fastening components 52 of the said part 36 on flange 34; in particular they are radially offset in relation to these fastening components. The centering and guiding sections 36d' extend axially towards the rear around flange 34. They are mainly used when installing or dismantling the air inlet structure to avoid possible damage to parts 50 and 44'.

Another modification of the first type of embodiment of the junction area, again applied to the first embodiment of the invention, is shown in FIG. 7. As in the examples shown in FIGS. 5 and 6, the forward extension 44' of the noise reducing honeycomb structure 44 is housed in an added part 50'. However, in this configuration added part 50' comprises, in addition to the L-shaped cross-section part surrounding the extension 44', a plane section 50'a fastened between flange 34 and the first arm 36a of the connection part 36. Fastening is achieved, for example, by means of rivets or screws 51 that connect plane section 50a to flange 34, located in positions that are offset in relation to the removable fastening means 52 of arm 36a on flange 34. Part 50' therefore remains fastened to motor flange 34 when the air inlet structure 18 is removed and it protects honeycomb structures 44 and 44'.

Again in the first embodiment of the invention, FIGS. 8 to 10 show different modifications of a second type of embodiment of the junction area in which the second arm 36b of the connection part 36 is fastened to the outside of rear section 20' of internal wall 20. In this configuration re-machining of the external surface of the rear section of wall 20 is necessary before fastening connection part 36 using fastening components 40. However, all the other advantages of the invention are retained, in particular the presence of noise reducing honeycomb structures in the junction area between the air inlet and the air blower housing.

In this configuration a shielding plate 21 advantageously covers the internal wall of rear section 20' of wall 20, as shown in FIGS. 8 to 10. The shielding plate 21 is then extended onto the rear surface of honeycomb core 30.

In FIGS. 8 and 9, the forward extension 44' of honeycomb structure 44 is mounted in a forward extension 22' of air blower housing 22, as in the examples shown in FIGS. 3 and 4. Machining 23 of the extension 22' can be used to center the rear section 20' of internal wall 20, as shown in FIGS. 8 and 9.

In all the embodiments shown in FIGS. 3 to 8, the junction surface 45 between honeycomb structure 44 and the section of internal wall 20 adjacent to rear section 20' is oriented radially in relation to the longitudinal axis of the turbine.

As is shown schematically in FIG. 9, the junction surface 45' may also be oriented towards the rear, working towards the outside of the turbine.

The modification shown in FIG. 9 also differs by the fact that the fastening of arm 36b of connection part 36 is partly achieved using standard fastening components 40 that pass through the rear section 20' of wall 20 and partly using "blind" fastening components 40' that pass through external skin 28 forward of rear section 20'.

In the second type of embodiment of the junction area, it is also possible to replace the forward extension of air blower housing 22 with an added part 50' that surrounds the forward extension 44' of the noise reducing honeycomb structure 44 and comprises a plane section 50'a fastened between flange 34 and the first arm 36a of connection part 36 (FIG. 10). In this configuration the external surface 51 of added part 50' can be machined to center rear section 20' of wall 20, as also shown in FIG. 10.

In the second type of embodiment of the junction area, the forward extension 44' of the honeycomb structure 44 can also be housed inside the added part 50 fastened directly onto the extension, as has already been described in relation to FIGS. 5 and 6 for the first type of embodiment. Centering of connecting part 34 is then advantageously achieved by fitting the first branch 36a of this connecting part with centering sections 36d projecting towards the rear around flange 34.

It should be noted that connection part 36 may be made in either a single, one-piece annular unit or in several sections fastened together in the arc of a circle or connected onto a separate section.

FIGS. 11 to 14 show the second embodiment of the invention, i.e. where the honeycomb structure 44' is a separate structure from that of honeycomb structure 44.

More precisely, FIGS. 11 and 12 show modifications of the first type of embodiment in which the rear section 20' of the internal wall 20 surrounds arm 36b of connection part 36.

In the configuration shown in FIG. 11, the honeycomb structure 44' is fastened directly, so that it may be disassembled, for example, onto arm 36b of part 36. Moreover, removable fastening components 40 such as screws connect arm 36b to the rear section 20' of internal wall 20.

In the configuration shown in FIG. 12, the same fastening components 40a fasten honeycomb structure 44' onto arm 36b of part 36 and branch 36b onto the rear section 20' of internal wall 20. These fastening components 40a then pass through the stack of parts one after the other. In order to do this, the honeycomb structure 44' preferably comprises at least one area of reinforced resistance 44'a at each point where fastening means 40a pass through. The area 44'a can be obtained by filling the corresponding honeycombs of structure 44'.

In the modifications shown in FIGS. 11 and 12, aerodynamic leaktightness means such as a seal 55 are inserted between the inner surfaces of internal wall 20 and honeycomb structure 44'.

FIGS. 13 and 14 show modifications of the second type of embodiment in which the rear section 20' of internal wall 20 is fastened to the inside of arm 36b of connection part 36.

In the configuration shown in FIG. 13, the honeycomb structure 44' is mounted in an added part 50' of which one section 50'a is fastened between flange 34 and part 36, as shown previously in FIG. 10. In this configuration however, part 50' is fastened onto arm 36a of part 36 by fastening means 56 such as rivets or screws that are separate from the means 52 fastening part 36 onto flange 34. Therefore, structure 44' and part 50' remain fastened to the air inlet structure when it is disassembled.

In the configuration shown in FIG. 14, the honeycomb structure 44' is fastened directly into rear section 20' of the internal wall 20, for example, by fastening means 40 that connect the rear part 20' to connection part 36. In this configuration aerodynamic leaktightness means 55 between wall 20 and structure 44' are also used.

What is claimed:

1. A noise reducing assembly for a turbine, said assembly comprising:
    an air inlet structure provided with an internal wall comprising an internal permeable skin, an impermeable external skin and a honeycomb core;
    an air blower housing provided with an external annular flange at the front end thereof and fitted on the inside with a first noise reducing honeycomb structure; and
    an annular connecting part fastened to said flange and to a rear section of the internal wall,
    wherein said rear section of the internal wall is not provided with a honeycomb core and is located substantially in line with said external skin, and wherein a second noise reducing honeycomb structure is housed on an internal side of said rear section of the internal wall.

2. The noise reducing assembly of claim 1, wherein said rear section of the internal wall comprises rear portions of the internal skin and the external skin, that are applied one against the other.

3. The noise reducing assembly of claim 1, wherein said connecting part has an L-shaped cross-section forming two arms which are respectively fastened to said flange and to said rear section of the internal wall.

4. The noise reducing assembly of claim 3, wherein one of said arms of the connecting part is fastened to an inner surface of said rear section of the internal wall.

5. The noise reducing assembly of claim 4, wherein said connecting part comprises a forward section that extends radially towards the inside along a forward surface of said honeycomb core.

6. The noise reducing assembly of claim 3, wherein one of said arms of the connecting part is fastened to an outer surface of said rear section of the internal wall.

7. The noise reducing assembly of claim 1, wherein said second noise reducing honeycomb structure consists of a forward extension of said first noise reducing honeycomb structure.

8. The noise reducing assembly of claim 1, wherein said second noise reducing honeycomb structure is separated from said first noise reducing honeycomb structure.

9. The noise reducing assembly of claim 7, wherein said forward extension of the honeycomb structure is located inside a forward extension of said air blower housing.

10. The noise reducing assembly of claim 9, wherein one of said arms of the connecting part is fastened to an inner surface of said rear section of the internal wall and wherein said connecting part is centered on said forward extension of the air blower housing.

11. The noise reducing assembly of claim 9, wherein one of said arms of the connecting part is fastened to an outer surface of said rear section of the internal wall and wherein said rear section of the internal wall is centered on said forward extension of the air blower housing.

12. The noise reducing assembly of claim 7, wherein said forward extension of the honeycomb structure is located internally to an added part, fastened on said extension.

13. The noise reducing assembly of claim 12, wherein said connecting part includes centering and guiding sections located around said flange.

14. The noise reducing assembly of claim 13, wherein said centering and guiding sections are an integral part of said connecting part.

15. The noise reducing assembly of claim 13, wherein said centering and guiding sections are fastened onto said connecting part by second fastening means different from first fastening means fastening said connecting part to said flange.

16. The noise reducing assembly of claim 1, wherein an added part comprising a plane section, fastened between said flange and said connecting part, partly surrounds said second noise reducing honeycomb structure.

17. The noise reducing assembly of claim 16, wherein said second noise reducing honeycomb structure consists of a forward extension of said first noise reducing honeycomb structure and wherein said plane section of the added part is fastened by fastening means that connect said flange to said connecting part.

18. The noise reducing assembly of claim 16, wherein said second noise reducing honeycomb structure consists of a forward extension of said first noise reducing honeycomb structure and wherein said plane section of the added part is fastened to said flange by different fastening means from those that fasten said connecting part to said flange.

19. The noise reducing assembly of claim 16, wherein said second noise reducing honeycomb structure is separated from said first noise reducing honeycomb structure and wherein said plane section of the added part is fastened onto the connecting part by different fastening means from those that connect said connecting part to said flange.

20. The noise reducing assembly of claim 19, wherein said second noise reducing honeycomb structure is fastened to said added part.

21. The noise reducing assembly of claim 16, wherein said connecting part has an L-shaped cross-section forming two arms which are respectively fastened to said flange and to the outside of said rear section of the internal wall and wherein said rear section of the internal wall is centered on said added part.

22. The noise reducing assembly of claim 6, wherein said second noise reducing honeycomb structure is separated from said first noise reducing honeycomb structure and wherein said second noise reducing honeycomb structure is fastened on the inside of said rear section of the internal wall.

23. The noise reducing assembly of claim 4, wherein said second noise reducing honeycomb structure is separated from said first noise reducing honeycomb structure and wherein said second noise reducing honeycomb structure is fastened on the inside of said connecting part.

24. The noise reducing assembly of claim 23, wherein said second honeycomb structure comprises at least one reinforced resistance area, removable fastening means passing through said reinforced resistance area for connecting said second honeycomb structure to said connecting part and for connecting said connecting part to said rear section of the internal wall.

25. The noise reducing assembly of claim 22, wherein aerodynamic leaktightness means are inserted between inner surfaces of said air inlet structure and said second honeycomb structure.

26. The noise reducing assembly of claim 1, wherein said second noise reducing honeycomb structure is separated from an interior surface of said internal wall adjacent to said rear section by a junction surface oriented towards the rear, working towards the outside.

27. The noise reducing assembly of claim 1, wherein said second noise reducing honeycomb structure is separated from an interior surface of said internal wall adjacent to said rear section by a radially orientated junction surface.

28. The noise reducing assembly of claim 24, wherein aerodynamic leaktightness means are inserted between inner surfaces of said air inlet structure and said second honeycomb structure.

29. A noise reducing assembly for turbines, said assembly comprising:

an air inlet structure provided with an internal wall comprising an internal permeable skin, an impermeable external skin and a honeycomb core;

an air blower housing provided with an external annular flange at the front end thereof and fitted on the inside with a first noise reducing honeycomb structure; and an annular connecting part fastened to said flange and to a rear section of the internal wall, wherein said rear section of the internal wall is not provided with a honeycomb core and is located substantially in line with said external skin, wherein a second noise reducing honeycomb structure is housed on an internal side of said rear section of the internal wall, and wherein said connecting part has an L-shaped cross-section forming two arms which are respectively fastened to said flange and to an inner surface of said rear section of the internal wall.

30. A noise reducing assembly for turbines, said assembly comprising:

an air inlet structure provided with an internal wall comprising an internal permeable skin, an impermeable external skin and a honeycomb core;

an air blower housing provided with an external annular flange at the front end thereof and fitted on the inside with a first noise reducing honeycomb structure; and an annular connecting part fastened to said flange and to a rear section of the internal wall, wherein said rear section of the internal wall is not provided with a honeycomb core and is located substantially in line with said external skin, wherein a second noise reducing honeycomb structure is housed on an internal side of said rear section of the internal wall, and wherein said connecting part has an L-shaped cross-section forming two arms which are respectively fastened to said flange and to an outer surface of said rear section of the internal wall.

\* \* \* \* \*